(12) United States Patent
Moody et al.

(10) Patent No.: US 7,111,424 B1
(45) Date of Patent: Sep. 26, 2006

(54) FORE GRIP WITH BIPOD

(76) Inventors: Joseph R. Moody, 738 Natures Hammock Dr., Jacksonville, FL (US) 32259; Joseph D. Gaddini, 4360 Deerwood La., Evans, GA (US) 30809

( * ) Notice: Subject to any disclaimer, the term of this patent is extended or adjusted under 35 U.S.C. 154(b) by 0 days.

(21) Appl. No.: 10/725,082

(22) Filed: Dec. 2, 2003

(51) Int. Cl.
F41C 23/00 (2006.01)

(52) U.S. Cl. .............................. 42/72; 42/94; 248/171
(58) Field of Classification Search ................. 42/94, 42/72; 248/171
See application file for complete search history.

(56) References Cited

U.S. PATENT DOCUMENTS

| 271,251 | A | | 1/1883 | Leerbech et al. |
|---|---|---|---|---|
| 575,529 | A | * | 1/1897 | Stephens ..................... 280/300 |
| 721,425 | A | * | 2/1903 | CLyde ......................... 248/170 |
| 1,295,688 | A | | 2/1919 | Butler |
| 1,355,660 | A | | 10/1920 | Farquhar et al. |
| 1,382,409 | A | | 6/1921 | Butler |
| 1,580,406 | A | | 4/1926 | Browning |
| 2,386,802 | A | | 10/1945 | Johnson |
| 2,420,267 | A | | 5/1947 | Sefried |
| 2,436,349 | A | | 2/1948 | Adams |
| 2,763,456 | A | * | 9/1956 | Breer ....................... 248/186.1 |
| 3,235,997 | A | | 2/1966 | Stoner |
| 3,632,073 | A | * | 1/1972 | Nakatani ..................... 248/169 |
| 4,121,799 | A | * | 10/1978 | Michio ........................ 248/171 |
| 4,545,660 | A | * | 10/1985 | Rudolf ........................ 396/425 |
| 5,345,706 | A | * | 9/1994 | Brown .......................... 42/94 |
| 5,384,609 | A | * | 1/1995 | Ogawa et al. .............. 396/419 |
| 5,438,786 | A | * | 8/1995 | Hilderbrand ................... 42/94 |
| 6,289,622 | B1 | * | 9/2001 | Desch et al. ................... 42/94 |
| 6,487,807 | B1 | | 12/2002 | Kopman et al. |
| 2005/0241206 | A1 | * | 11/2005 | Teetzel et al. ................. 42/72 |

FOREIGN PATENT DOCUMENTS

FR          2623595       *   5/1989

* cited by examiner

Primary Examiner—Michelle Clement
(74) Attorney, Agent, or Firm—Brian S. Steinberger; Law Offices of Brian S. Steinberger, P.A.

(57) ABSTRACT

A fore grip with a concealable and collapsible bipod has a tubular recess consisting of two cylindrical cutouts the housing for the legs when concealed and as the housing for a sliding piston that deploys the legs. A release has a compression spring positioned between piston assembly and the bottom of the first cutout and this spring; The legs are connected to the bottom of the piston via a hinge and spring that when released causes the legs to expand outward until fully deployed.

12 Claims, 4 Drawing Sheets

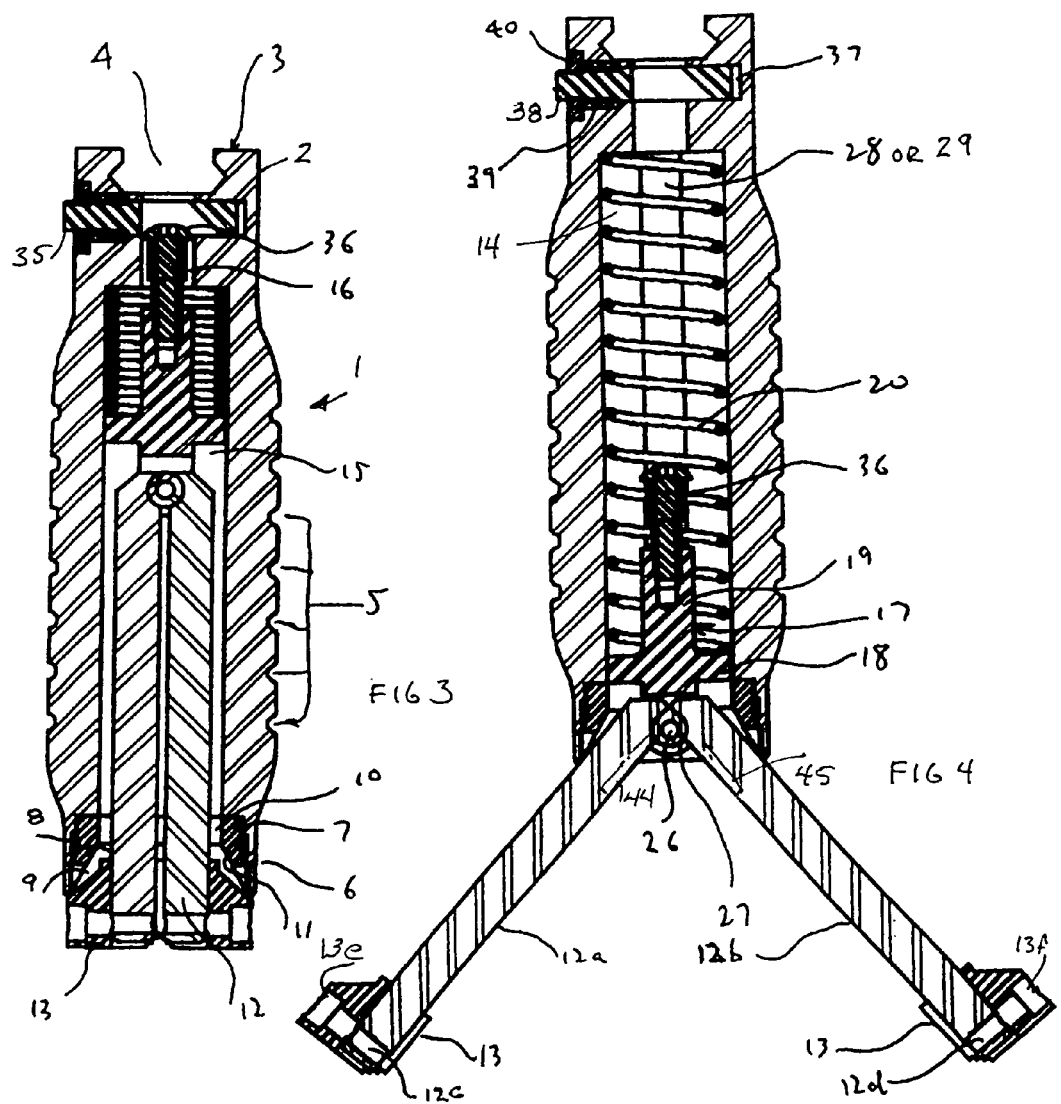

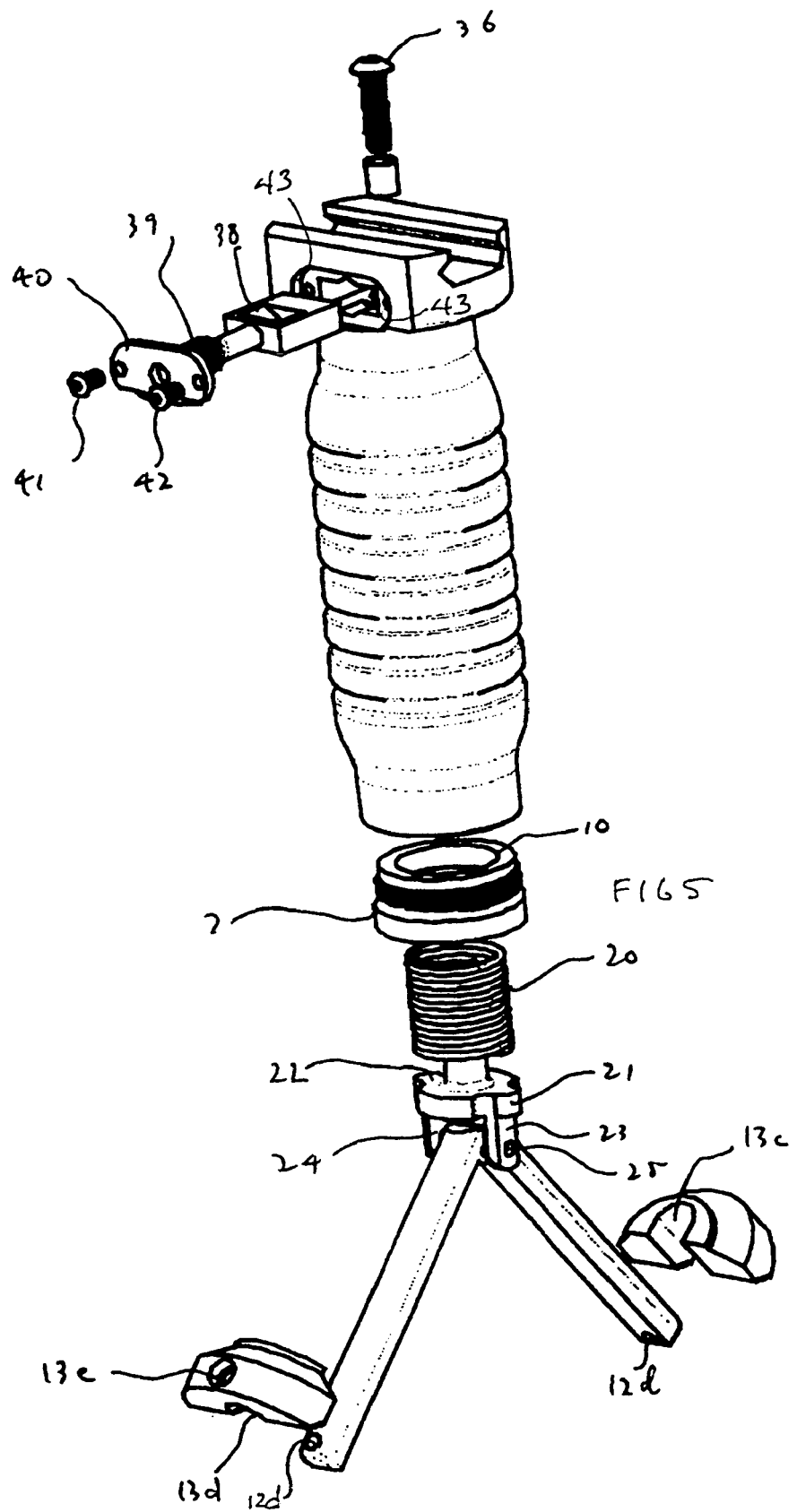

FORE GRIP WITH BIPOD

BACKGROUND OF THE INVENTION

1. Field of the Invention

The present invention relates to gun bipods and more particularly to a new fore grip or gun handle that provides a combination pistol grip and a bipod that is concealable and collapsible inside the pistol grip.

2. Description of the Prior Art

There has been considerable prior art for bipods, and the prior art dates back to pre-20th century times, with bipods having a familiar appearance, structure and configuration.

The known prior art includes U.S. Pat. Nos. 271,251; 1,295,688; 1,355,660; 1,382,409; 1,580,406; 2,386,802; 2,420,267; 2,436,349, and 3,235,997.

These patents disclose the respective art in relation to bipods, but do not disclose a fore grip or gun handle with a concealable and collapsible bipod. The invention includes a replaceable mounting assembly that allows for mounting of the gun handle by various means to a gun. A fore grip or gun handle, designed with ergonomic reasons in mind, provides a stable means of holding the gun. A plurality of legs that are concealed within the fore grip are coupled via a hinge to a spring piston assembly. A spring-loaded fulcrum release mechanism holds the piston assembly in a compressed and locked position. When the piston assembly is released upon activation of the spring-loaded fulcrum release mechanism, the legs are driven downwards by the piston and upon being released from the confinement of the fore grip are deployed outwards to a locked position by a hinge or pivot mechanism. The legs have feet that are designed so that, when the legs are concealed within the handle, the feet seal off the deployment and spreader mechanisms from entrance of any debris, material etc that may interfere with the deployment of the bipod.

A recent U.S. Pat. No. 6,487,807 describes a tripod gun handle that provides a combination pistol grip and pivotal tripod. Close examination of this patent reveals a number of problems with this device, and the most obvious problem is that the tripod legs are positioned on the exterior of the handle when not deployed. If the gun with this device attached was being used in wet or muddy environments, either in a deployed or storage position, the ingress of mud and dirt into and around the handle could result in the deployment and storage of the tripod legs being severely restricted due to the mud or foreign matter. Another problem is that deployment requires the rotation of a disengagement cam to force the legs into their deployed position and then a leg locking assembly is rotated to lock the legs into a locked position. Two separate actions are required to deploy and lock the tripod legs into a locked position.

The fore grip with concealable and collapsible bipod, according to the invention is considerably different from the concepts and designs of the prior art, and provides an entirely new device that provides a combination of a fore grip or gun handle with a concealable and collapsible bipod that opens into an exposed bipod that locks open upon release from the concealment position within the fore grip or gun handle.

SUMMARY OF THE INVENTION

The disclosed invention, which shall be subsequently described in greater detail, provides a new fore grip or gun handle with a concealable and collapsible bipod that has many advantages of the bipods mentioned previously and has many new and novel features, which result in a new fore grip or gun handle with a concealable and collapsible bipod that has not been suggested, anticipated or even rendered obvious by any of the prior art bipods or the aforementioned tripod gun handle.

The present invention comprises a mounting assembly that may be self-contained or may feature adaptable mounting heads to interface with Weaver or Picatinny Rail mounts or a simple bolt attachment to a firearm. A fore grip is coupled to the mounting assembly, or may be integrated with the mounting assembly, and the fore grip is to be gripped by the hand of a user when the mounting assembly is attached or coupled to a firearm. The fore grip is used for stabilizing the firearm during firing when the user grips the fore grip. A tubular recess consisting of two cylindrical cutouts is positioned within the fore grip or gun handle, and these cutouts serve as the housing for the bipod legs when concealed and as the housing for a sliding piston assembly that deploys the bipod legs. A plurality of legs is concealed within the fore grip or gun handle and is coupled to a sliding piston assembly that is also concealed within the handle. A catch system that protrudes from the sliding piston assembly is attached to the sliding piston assembly and interfaces with a spring-loaded fulcrum release mechanism positioned at the top of the handle. A cutout within the top of the handle provides a housing for the release mechanism. A compression spring is positioned between the sliding piston assembly and the bottom of the first cylindrical cutout and this spring, when under expansion, drives the sliding piston assembly downward toward the bottom of the fore grip. At the bottom of the fore grip, a recessed locking ring or plug is secured by threads into the fore grip, and is positioned to prevent the sliding piston assembly from over-travel and thus exiting the fore grip. The legs are connected to the bottom of the piston via a hinge or pivot point, and when the legs are released from confinement within the fore grip, the legs expand outwards until fully deployed.

It is therefore an object of the present invention to provide a new fore grip or gun handle with a concealable and collapsible bipod that provides a combination fore grip or gun handle and bipod.

It is also an object of the present invention to provide a new fore grip or gun handle with a concealable and collapsible bipod that includes a mounting system for attaching to or coupling to a firearm.

It is a further object of the present invention to provide a new fore grip or gun handle with a concealable and collapsible bipod that provides a removable gun handle that helps to stabilize the gun when firing occurs.

BRIEF DESCRIPTION OF THE DRAWINGS

Referring particularly to the drawings for the purposes of illustration only, and not limitation:

FIG. 3 is a cross-sectional view of an embodiment of the invention showing the fore grip with the legs in a stored position.

FIG. 4 is a cross-sectional view of an embodiment of the invention showing the fore grip with the legs in a deployed position.

FIG. 5 is an exploded view of an embodiment of the invention

DESCRIPTION OF THE PREFERRED EMBODIMENT

Figure 1:
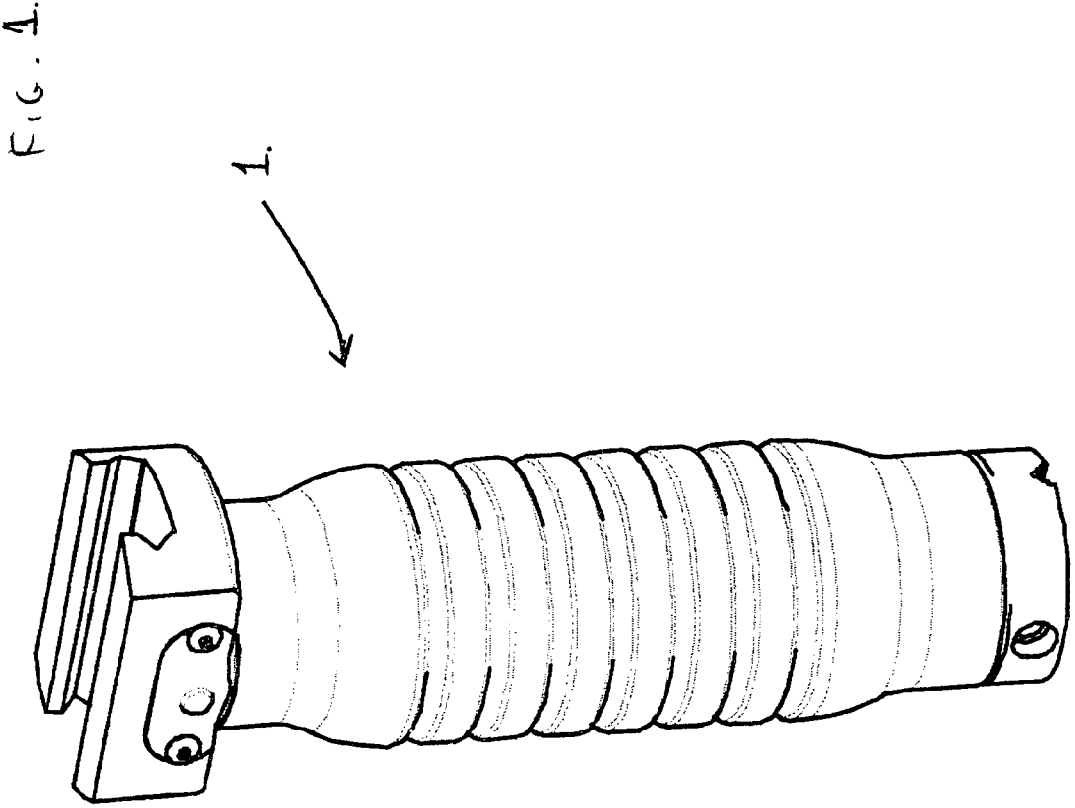
FIG. 1 is an elevational view of an embodiment of the invention showing the fore grip with the legs in the stored position.
Figure 2:
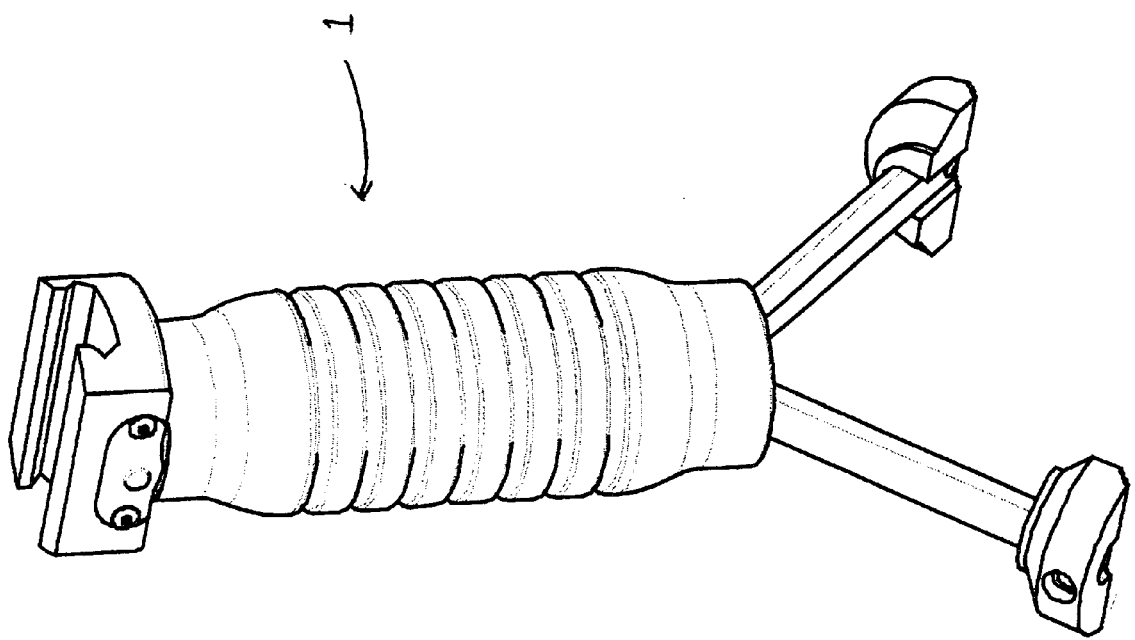
FIG. 2 is an elevational view of an embodiment of the invention showing the fore grip with the legs in the deployed position.

As illustrated in FIGS. 1 through to 5, the fore grip 1 with concealable and collapsible bipod consists of four distinct and separate assemblies, and these are the fore grip, the piston assembly, the legs, and the release mechanism.

The fore grip consists of a fore grip with a mounting section or end 3 that is designed for attachment to a gun. The fore grip may consist of a machining or a casting that utilizes aluminum or a molding that utilizes high impact resistant polymer or a composite material. The fore grip section 2 has a mounting end 3 that allows for coupling or attachment to a firearm. The fore grip is a grip designed for gripping by the hand of a user when the fore grip 1 is attached to a firearm. Although FIGS. 1 through 5 show the mounting end 3 being an integral part of the handle for illustration purposes only, it should be understood that the mounting end 3 may be a separate component that is then attached by known means, such as threads or a lock screw or locking bolt to the handle 1. For illustrative purposes, the mounting end 3 is shown with a cut out profile 4 that enables mounting of the handle 1 to a firearm via the use of a Picatinny mounting rail (MIL-STD-1913 rail), a mounting system widely used by military for attachment of various devices to military rifles. However, it should be understood that other means of attachment to a firearm could be used.

The fore grip 2 has a plurality of annular grooves 5 around the circumference of the fore grip section 2 and these grooves 5 are designed to aid in improving the gripping of the fore grip section 2. These grooves 5 are positioned on approximately two-thirds of the fore grip section 2 and if fore grip 1 is fabricated from aluminum, these grooves 5 may assist in reducing the weight of the gun handle. Although seven annular grooves are shown in FIGS. 1 through 5, this is for illustrative purposes only, and the number of grooves may vary.

The base or bottom 6 of the fore grip section 2 has a recessed locking ring 7 or stop ring that is shown secured to the fore grip section 2 by threads though it should be understood that other means of securing, such as a press fit or a chemical locking compound, may be used in place of threads. The recessed locking ring 7 fits into a recess or cutout 8 at the base of the handle section 2 and a further recess or cutout 9 is provided for the feet 13 of the bipod legs 12 when in the stored position. The recessed locking ring 7 has a cylindrical hole 10 that has two functions. Hole 10 allows for the passage of the bipod legs into the body of the handle section 2 when the bipod legs are stored in the handle section 2 and also allows for the passage of the piston 17 when the bipod legs are deployed. The recessed locking ring 7 also has a tapered or counter-sunk recess 11 that enables the feet 13 of the bipod to fit inside the handle 2 when the bipod legs 12 are in the stored position. An o-ring (not shown) is used in conjunction with the recessed locking ring 7 to dampen the sound of the piston when it comes into contact with the recessed locking ring. A series of cut outs (not shown) are machined into the end of the recessed locking ring 7 to enable a wrench being used to tighten up the locking ring upon assembly of the piston and legs into the fore grip.

The fore grip has a internal tubular recess 14 consisting of two cylindrical recesses 15 and 16 that are positioned within the fore grip or gun handle, and these recesses serve as the housing for the bipod legs when concealed and as the housing for a sliding piston assembly that deploys the bipod legs, and for the catch or male part 36 of the spring-loaded fulcrum release mechanism 35. Cylindrical recess 15 is used for the housing for the sliding piston assembly and the bipod legs while cylindrical hole 16 is used for the passageway of the catch or male part 36 of the spring-loaded fulcrum release mechanism 35. Cylindrical recess 15 also has two recesses or longitudinal grooves 28 and 29 (only 28 is shown in FIG. 4) that are positioned 180 degrees apart from each other and extend upwards from the base or bottom 6 of the fore grip. The recesses 28 and 29 extend for the entire length of the cylindrical recess 15. It should be understood that for descriptive and illustrative purposes two recesses or longitudinal grooves are detailed and disclosed, but at least one recess or longitudinal groove may be used.

The piston assembly 17 consists of three sections, these being the piston head 18, the piston shaft 19, and the spring 20. The piston head 18 has two lugs 21 and 22 that protrude outwards from the piston head and these lugs are 180 degrees apart from each other. The hinge coupling lugs 23 and 24 protrude downwards from the piston head 18 and are positioned 180 degrees apart from each other. Both hinge coupling lugs 23 and 24 have a cylindrical hole 25 for a locking pin 26 that secures the bipod legs to the hinge coupling lugs 23 and 24, thus forming a hinge point 27.

The two lugs 20 and 21 protruding outwards from the piston head 18 interface with the two recesses or longitudinal grooves 28 and 29 that are part of the tubular recess 14. The lugs 20 and 21 fit within the two recesses 28 and 29 and ensure that the piston 17 does not rotate around the center axis of the tubular recess 14 when the bipod is deployed by the piston being driven downwards upon expansion of the spring 20 and when the piston 17 is in the closed position and the bipod is not deployed. It should be understood that for descriptive and illustrative purposes two protruding lugs are detailed and shown for interfacing with two longitudinal recesses or grooves, but at least one protruding lug may be used to interface with at least one recess or longitudinal groove. It should also be understood that other means of prevention of rotation of the piston around the center axis of the tubular recess may also be used as is known, and this may include tubular recess 15 being provided with at least one longitudinal protrusion that interfaces with at least one corresponding recess on the piston head 18 thereby preventing rotation of the piston upon deployment of the legs and when the piston and legs are in the stored position.

The bipod legs 12 consist of two legs 12a and 12b with two feet 13 that are shown attached to the legs by known means, such as screws but it should be understood that the feet may also be integral with the legs. For illustration purposes, the legs are shown with a half-moon or half-round shape, with the flats facing each other, and it should be understood that other profiles or lengths, such as triangular, may be used. At the bottom of each leg 12a and 12b, a hole 12c and 12d is positioned for securement or attachment of the feet 13, though said holes may be eliminated if other means of securement or attachment are used.

The two feet 13a and 13b are of a half-moon or half round shape at the base of the feet, and have an external tapered section that interfaces with the recess 11 of the recessed locking ring 7. The two feet also have a recess 13c and 13d to allow the legs 12 to fit into, and a transverse hole 13e and 13f for, in this instance, a locking screw. Other means of securement or attachment to attach the feet to the legs may be used, such as welding or dovetail cuts or pins. The thickness of the feet may be varied to compensate for the difference in the height of the fore grip when attached to different guns. If the feet are integral with the legs, known means such spacer elements may be attached to vary the length of the legs to compensate for the difference in height of the fore grip when attached to different guns.

The hinge point 27 consists of a left and right hinge pivot (not shown) that is machined into the top of the legs 12a and 12b, and each pivot is 180 degrees apart. A coil spring 44 is positioned between each of the legs 12a and 12b, and is secured by the locking pin 26. On the inside of the legs 12a and 12b, a small recess 45 is machined to seat the spring 44 in each of the two legs.

At the top of the fore grip or mounting end 3, a spring-loaded fulcrum release mechanism 35 is positioned within a transverse recess 37. Transverse recess 37 is positioned so that it crosses cylindrical hole 16. The spring-loaded fulcrum mechanism 35 consists of a fulcrum latch plate 38, a spring 39, a tension plate 40, and two screws 41 and 42 that secure and retain the tension plate to the fore grip. On one side of the fore grip at the mounting end, a rectangular recess with rounded ends 43 is machined into the fore grip to match the shape of the tension plate. The fulcrum latch plate 38 consists of a rectangular plate with a beveled cut out that serves as the catch surface for the catch or male part 36 of the spring-loaded fulcrum release mechanism. The male part 36 of the spring-loaded fulcrum release mechanism is shown for illustration purposes to be a round-headed bolt, though other known forms may be used. The male part 36 is secured or fixed into the top of the piston shaft 19 and it should be understood that for illustration purposes, male part 36 is shown being retained in the piston shaft 19 by threads but various other means of securement such as a press fit or welding may be used.

To use the fore grip, a user simply attaches the fore grip to the gun, regardless of whether or not the bipod legs are deployed. If the legs are deployed, then the user has the option of using the gun with the legs deployed or compressing or squeezing the legs together, and pushing them upwards into the fore grip until the male part of the spring-loaded fulcrum release mechanism catches and locks the bipod legs and the piston assembly into the closed position. One does not need to rotate any locking rings to either lock the legs in the closed position or release the legs from the closed position. It is simply a matter of depressing the tension plate to release the piston assembly and allow the bipod legs to move downwards and deploy upon the piston reaching the end-of-travel position. The spring mechanism within the hinge point ensures that the legs are expanded outwards and are thus deployed.

While the invention has been shown and described with reference to a specific preferred embodiment, modifications and changes may now be readily apparent to those skilled in the art. Such modifications and various changes in form and detail may be made herein without departing from the spirit and scope of the invention. Accordingly, it is understood that the invention will be limited only by the appended claims.

What is claimed is:

1. An ergonomic fore grip mountable to a firearm to stabilize the firearm, comprising:
    a) a top end and a bottom end and cut out there through;
    b) a mount for attaching the top end of the fore grip to a firearm;
    c) a vertically sliding piston inside the fore grip;
    d) two legs coupled to the sliding piston;
    e) a catch-lock that catches and locks the legs and the sliding piston in a closed position inside the fore grip;
    f) a spring-loaded fulcrum release mechanism for releasing the catch-lock;
    g) a depressible tension plate on an outside surface of the fore grip to activate the release mechanism causing the spring-piston to drive the legs downward to the bottom end of the fore grip;
    h) an expansion spring positioned between the legs causing the legs to expand outward to a locked position after the legs are released from confinement within the fore grip, wherein the sliding piston, the catch-lock, the legs, the spring-loaded fulcrum release mechanism and the expansion spring between the legs are all located and concealed inside of the fore grip in the closed position.

2. The fore grip as defined in claim 1 wherein the sliding piston assembly at the top end of the fore grip includes a piston having a piston shaft and a piston head, the piston head attached to the legs, and a spring mounted between the top end of the fore grip and the shaft for biasing said piston downwardly.

3. The fore grip as defined in claim 2 further including a spring-loaded fulcrum release mechanism having a fulcrum latch plate, with a beveled cut out that serves as a catch surface for the catch-lock to secure the top of the piston shaft and the legs in a stored position.

4. The fore grip as defined in claim 2, further including a hinge for coupling the legs to the sliding piston assembly.

5. The fore grip as defined in claim 1 further including a recessed locking ring at the bottom end of the fore grip to prevent the sliding piston assembly from exiting the fore grip when the legs are deployed.

6. The fore grip as defined in claim 2 further including a tubular recess within the fore grip with at least one longitudinal protrusion and the sliding piston with at least one recess that interfaces with the longitudinal protrusion for preventing rotation of the piston upon deployment of the legs and when the piston and legs are in a stored position.

7. The fore grip as defined in claim 1 wherein the legs are provided with feet.

8. The fore grip as defined in claim 1 wherein the fore grip has a plurality of annular grooves around the circumference of the grip portion.

9. The fore grip as defined in claim 7, wherein the feet include:
    a surface portion so that when the legs are concealed within the handle, the feet seal off the deployment and spreader mechanisms from entrance of any material that interferes with the deployment of the legs.

10. The fore grip as defined in claim 1, wherein the two legs includes:
    each leg having upper ends and bottom ends, the two legs having feet on each of the bottom ends, the two legs being solely extendable from underneath the fore grip, the two legs having a hinge point at their upper ends for allowing the bottom ends to expand outward from one another.

11. A method for using an ergonomic fore grip with concealable and collapsible bipod legs having a spring-loaded fulcrum release mechanism comprising the steps of:
    mounting a fore grip to a lower surface of a firearm;
    the fore grip comprising a top end and a bottom end and cut out there through;
    a mount for attaching the top end of the fore grip to a firearm;
    a vertical sliding piston inside the fore grip;
    two legs coupled to the sliding piston;

a catch-lock that catches and locks the legs and the sliding piston in a closed position inside the fore grip;

a spring-loaded fulcrum release mechanism for releasing the catch-lock;

a depressible tension plate on an outside surface;

and an expansion spring positioned between the legs; wherein the sliding piston, the catch-lock, the legs, the spring-loaded fulcrum release mechanism and the expansion spring between the legs are all located and concealed inside of the fore grip in a closed position;

depressing the tension plate in the spring-loaded fulcrum release mechanism to release the spring-piston that drives the bipod legs downward to release the legs from confinement within the fore grip;

expanding the bipod legs outward beneath the firearm to a fully deployed position;

supporting the fully deployed legs on a surface;

gripping the fore grip; and firing the firearm that is now supported in a stabilized position.

12. The method of claim 11, wherein the expanding step further includes the step of:

an expansion spring for expanding the bipod legs outward from one another.

* * * * *